US011435203B2

(12) United States Patent
Brot et al.

(10) Patent No.: US 11,435,203 B2
(45) Date of Patent: Sep. 6, 2022

(54) METHOD AND SYSTEM FOR MERGING MEASUREMENTS OF FLIGHT PARAMETERS OF AN AIRCRAFT

(71) Applicant: Airbus Operations (S.A.S.), Toulouse (FR)

(72) Inventors: Patrice Brot, Ramonville-Saint-Agne (FR); Olivier Sapin, Toulouse (FR)

(73) Assignee: Airbus Operations (S.A.S.), Toulouse (FR)

( * ) Notice: Subject to any disclaimer, the term of this patent is extended or adjusted under 35 U.S.C. 154(b) by 405 days.

(21) Appl. No.: 16/378,840

(22) Filed: Apr. 9, 2019

(65) Prior Publication Data

US 2019/0316933 A1 Oct. 17, 2019

(30) Foreign Application Priority Data

Apr. 13, 2018 (FR) ...................................... 1853242

(51) Int. Cl.
*G01P 13/02* (2006.01)
*G01D 3/08* (2006.01)
*B64D 43/02* (2006.01)

(52) U.S. Cl.
CPC ............... *G01D 3/08* (2013.01); *B64D 43/02* (2013.01); *G01P 13/025* (2013.01)

(58) Field of Classification Search
CPC ..... G01D 3/08; G05B 23/0221; G01P 13/025; G01C 21/165; B64D 43/02; G05D 1/00
(Continued)

(56) References Cited

U.S. PATENT DOCUMENTS 6,653,971 B1 * 11/2003 Guice .................. A01M 1/026
342/22
7,395,122 B2 * 7/2008 Kreidler ............. G05B 19/0426
700/108
(Continued)

FOREIGN PATENT DOCUMENTS

FR 3 013 834 A1 5/2015

OTHER PUBLICATIONS

French Search Report and Written Opinion for Application No. 1853242 dated Dec. 6, 2018.

*Primary Examiner* — Jeffrey P Aiello
(74) *Attorney, Agent, or Firm* — Jenkins, Wilson, Taylor & Hunt, PA (57) ABSTRACT

Method and system for merging measurements of flight parameters of an aircraft. The system is for merging measurements of flight parameters of an aircraft, linked to one another by at least one equation, and includes at least one acquisition module for acquiring at least one measurement of flight parameters, a scoring module for attributing a first validity score to the equations by checking whether the measurement or measurements of flight parameters are a solution or solutions of the equation or equations, a scoring module for attributing a second validity score to failure scenarios involving one or more acquisition modules from the first validity scores, a determination module for determining the validity of the measurements of flight parameters from the second validity scores, consolidation module for consolidating the measurements of flight parameters, a transmission module for transmitting the consolidated measurements of flight parameters to a user device.

19 Claims, 2 Drawing Sheets

(58) Field of Classification Search
USPC ..... 700/28, 108, 110; 701/3–4, 14; 702/144, 702/179, 181–185, 188
See application file for complete search history.

(56) References Cited

U.S. PATENT DOCUMENTS

| | | | |
|---|---|---|---|
| 9,268,330 B2* | 2/2016 | Brot | G01D 3/08 |
| 2013/0035809 A1* | 2/2013 | Ezerzere | G05B 13/04 |
| | | | 701/7 |
| 2013/0325404 A1* | 12/2013 | Yuen | A61B 5/1118 |
| | | | 702/182 |
| 2014/0236395 A1* | 8/2014 | Guillet | G05B 9/03 |
| | | | 701/3 |
| 2015/0148997 A1* | 5/2015 | Brot | G01P 21/025 |
| | | | 701/3 |
| 2018/0348250 A1* | 12/2018 | Higgins | G01P 5/00 |

* cited by examiner

METHOD AND SYSTEM FOR MERGING MEASUREMENTS OF FLIGHT PARAMETERS OF AN AIRCRAFT

CROSS-REFERENCE TO RELATED APPLICATION

This application claims priority to French patent application number 18 53242 filed on Apr. 13, 2018, the entire disclosure of which is incorporated by reference herein.

TECHNICAL FIELD

The disclosure herein relates to a system and a method that makes it possible to merge measurements of flight parameters of an aircraft.

BACKGROUND

An aircraft is normally equipped with a certain number of sensors making it possible to measure flight parameters describing its state at each instant. These flight parameters are then used by different systems. Among these there are the flight controls and the automatic pilot which are important user systems. It is necessary to ensure that these user systems use measured flight parameters that are true, that is to say flight parameter values which are not erroneous as a result of any failure. The flight parameters must also be sufficiently available for the user systems not to stop operating. Generally, a sensor takes over from another sensor when the latter sensor fails. Thus, these sensors are installed on the aircraft with a certain level of redundancy, in order to ensure the integrity and the availability of the user systems. Generally, an avionics system receives measurements of one and the same parameter originating from several redundant sensors. When these measurements differ, the avionics system performs a merging of data in order to estimate the parameter with the lowest risk of error. This merging of data corresponds, for example, to an average or a median of the measurements concerned.

US 2015/0148997 describes a data merging method. However, only data of one and the same flight parameter are processed in this method.

The disclosure herein relates therefore to a data merging method that is applicable to all the flight parameters of the aircraft and intended for all the user systems.

SUMMARY

An object of the disclosure herein is to overcome these drawbacks by proposing a method and a system for merging data.

To this end, the disclosure herein relates to a method for merging measurements of flight parameters of an aircraft, the measurements of flight parameters being linked to one another by at least one equation.

According to the disclosure herein, the merging method comprises the following steps:
an acquisition step, implemented by at least one acquisition module, consisting in or comprising acquiring at least one measurement of at least one flight parameter;
a first scoring step, implemented by a first scoring module, consisting in or comprising attributing respectively a first validity score to the equation or to each of the equations linking the measurements of the flight parameters to one another, the first validity score being determined by checking whether the measurement or measurements of the flight parameter or parameters are a solution or solutions of the equation or equations;
a second scoring step, implemented by a second scoring module, consisting in or comprising attributing respectively a second validity score to one or more failure scenarios, each of the failure scenarios involving one or more acquisition modules, the second validity score for a failure scenario considered being determined from the first validity score or scores attributed to the equation or equations linking the measurements of the flight parameters acquired by the acquisition module or modules involved respectively in the failure scenario considered;
a determination step, implemented by a determination module, consisting in or comprising determining the validity of the measurement or measurements of the flight parameter or parameters from the second validity score or scores;
a consolidation step; implemented by a consolidation module; consisting in or comprising consolidating the measurements of flight parameters as a function of the validity of the measurements determined in the determination step,
a transmission step, implemented by a transmission module; consisting in or comprising transmitting the consolidated measurement or measurements of the flight parameter or parameters to a user device.

Thus, the merging method corresponds to a generic data merging method making it possible to check the validity of the measurements of all the flight parameters, in order for the consolidated measurements of flight parameters to be transmitted to the user systems.

According to a particular feature, the first scoring step comprises the following substeps, each of the following substeps being implemented for each of the equations:
a first computation substep, implemented by a first computation submodule, consisting in or comprising computing an absolute value of a result of the equation with no second term from the measurement or measurements of the flight parameter or parameters involved in the equation;
a comparison substep, implemented by a comparison submodule, consisting in or comprising comparing the absolute value of the result with at least one predetermined threshold value;
a first scoring substep, implemented by a first scoring submodule, consisting in or comprising attributing the first validity score to the equation from the comparison of the absolute value of the result with the predetermined threshold value or values.

According to a first variant, the absolute value of the result is compared in the comparison substep with a predetermined threshold value,
the first validity score attributed is equal to 1 if the absolute value of the result is below the predetermined threshold value,
the first validity score attributed is equal to 0 if the absolute value of the result is above or equal to the predetermined threshold value.

According to a second variant, the absolute value of the result is compared in the comparison substep with a first predetermined threshold value and a second predetermined threshold value, the first predetermined threshold value being lower than the second predetermined threshold value,
the first validity score attributed being equal to 1, if the absolute value of the result is below the first predetermined threshold value, the first validity score attributed being equal to 0, if the absolute value of the result is above or equal to the second threshold value, the first validity score attributed being greater than 0 and less than 1 according to a monotonic function decreasing from 1 to 0 as the absolute value of the result increases, if the absolute value of the result is above or equal to the first predetermined threshold value and if the absolute value of the result is below the second predetermined threshold value.

According to another particular feature, the first scoring step comprises:

a second computation substep, implemented by a second computation submodule, consisting in or comprising computing a statistical value, from a classification method, from the equation or equations and from the measurement or measurements of the flight parameter or parameters, a second scoring substep, implemented by a second scoring submodule, consisting in or comprising attributing the first validity score by taking account of the statistical value.

According to a first embodiment, the second scoring step comprises the following substeps, each of the following substeps being implemented for each of the failure scenarios:

a first identification substep, implemented by a first identification submodule, consisting in or comprising identifying, out of the equation or equations, the equation or equations linking the measurements of flight parameters acquired by the acquisition module or modules involved in the failure scenario, the acquisition module or modules identified further corresponding to the acquisition module or modules for which the failure scenario assumes that the acquisition module or modules provide non-erroneous measurements, a third scoring substep, implemented by a third scoring submodule, consisting in or comprising attributing the second validity score as a function of the first validity score of the equation or equations identified in the first identification substep.

According to a first variant of the first embodiment, the second validity score attributed in the third scoring substep is equal to 1 if the equation or all the equations identified in the first identification substep have a first attributed validity score equal to 1. The second validity score attributed in the third scoring substep is equal to 0 if at least one of the equations identified in the first identification substep has a first validity score different from 1.

According to a second variant of the first embodiment, the second validity score attributed in the third scoring substep is equal to a result of a combination by a fuzzy "AND" operator of the first validity score or scores of the equation or equations identified in the first identification substep.

According to a second embodiment, the second scoring step comprises the following substeps:

a second identification substep, implemented by a second identification submodule, consisting in or comprising identifying, out of the equations, one or more first equations linking the measurements of flight parameters acquired by the acquisition module or modules involved in the failure scenario, the acquisition module or modules identified further corresponding to the acquisition module or modules for which the failure scenario assumes that the acquisition module or modules provide non-erroneous measurements, and one or more second equations linking the measurements of flight parameters acquired by the acquisition module or modules involved in the failure scenario and for which the failure scenario assumes that the acquisition module or modules provide erroneous measurements, a fourth scoring substep, implemented by a fourth scoring submodule, consisting in or comprising attributing the second validity score to each of the failure scenarios from the equation or equations identified in the second identification substep.

According to a first variant of the second embodiment, the second validity score attributed in the fourth scoring substep is equal to 1 for the failure scenario or scenarios involving the acquisition module or modules configured to acquire the measurement or measurements of the flight parameter or parameters linked by the equation or equations identified in the second identification substep, if the first equation or equations identified in the second identification substep have a first attributed validity score equal to 1 and if the second equation or equations identified in the second identification substep have a first attributed validity score equal to 0. The second validity score attributed in the fourth scoring substep is equal to 0 for the failure scenario or scenarios involving the acquisition module or modules configured to acquire the measurement or measurements of the flight parameter or parameters linked by the equation or equations which are not identified in the second identification substep.

According to a second variant of the second embodiment, the failure scenario or scenarios involving one or more acquisition modules configured to acquire the measurement or measurements of the flight parameter or parameters linked by the first equation or equations identified in the second identification substep, the second validity score is equal to a result of a combination by a fuzzy "AND" operator of the first validity score or scores attributed to the first equation or equations linking the flight parameters, and, for the failure scenario or scenarios involving none of the acquisition modules configured to acquire the measurement or measurements of the flight parameter or parameters linked by the equation or equations identified in the second identification substep, the second validity score is equal to 0.

Furthermore, according to a first variant, the determination step comprises the following substeps, each of the following substeps being implemented for each of the measurements of the flight parameter or parameters:

a third identification substep, implemented by a third identification submodule, consisting in or comprising identifying the failure scenario or scenarios involving the acquisition module configured to acquire the flight parameter measurement, for which the second validity score attributed is equal to 1, a first determination substep, implemented by a first determination submodule, consisting in or comprising determining the validity of the flight parameter measurement from the failure scenario or scenarios identified in the third identification substep, the flight parameter measurement being valid if there is at least one failure scenario for which the second validity score attributed is equal to 1, otherwise the flight parameter measurement is not valid.

Furthermore, according to a second variant, the determination step comprises a second determination substep, implemented by a second determination submodule for each of the measurements of the flight parameter or parameters, consisting in or comprising determining the validity of the flight parameter measurement, the validity of the flight parameter measurement being equal to a result of a combination by a fuzzy "OR" operator of the second validity scores attributed to the failure scenarios involving the acquisition module configured to acquire the flight parameter measurement.

The disclosure herein relates also to a system for merging measurements of flight parameters of an aircraft, the measurements of flight parameters being linked to one another by at least one equation.

According to the disclosure herein, the merging system comprises:
- at least one acquisition module configured to acquire at least one measurement of at least one flight parameter;
- a first scoring module configured to attribute respectively a first validity score to the equation or to each of the equations linking the measurements of the flight parameters to one another, the first validity score being determined by checking whether the measurement or measurements of the flight parameter or parameters are a solution or solutions of the equation or equations;
- a second scoring module configured to attribute respectively a second validity score to one or more failure scenarios, each of the failure scenarios involving one or more acquisition modules, the second validity score for a failure scenario considered being determined from the first validity score or scores attributed to the equation or equations linking the measurements of the flight parameters acquired by the acquisition module or modules involved respectively in the failure scenario considered;
- a determination module configured to determine the validity of the measurement or measurements of the flight parameter or parameters from the second validity score or scores;
- a consolidation module configured to consolidate the measurements of the flight parameter or parameters as a function of the validity of the measurements determined by the determination module,
- a transmission module configured to transmit the consolidated measurement or measurements of the flight parameter or parameters to a user device.

The disclosure herein relates also to an aircraft, in particular a transport aeroplane, which comprises a system for merging measurements of flight parameters, such as that described above.

BRIEF DESCRIPTION OF THE FIGURES

The disclosure herein, with its features and advantages, will emerge more clearly on reading the description given with reference to the attached, example drawings in which.

DETAILED DESCRIPTION

Figure 1:
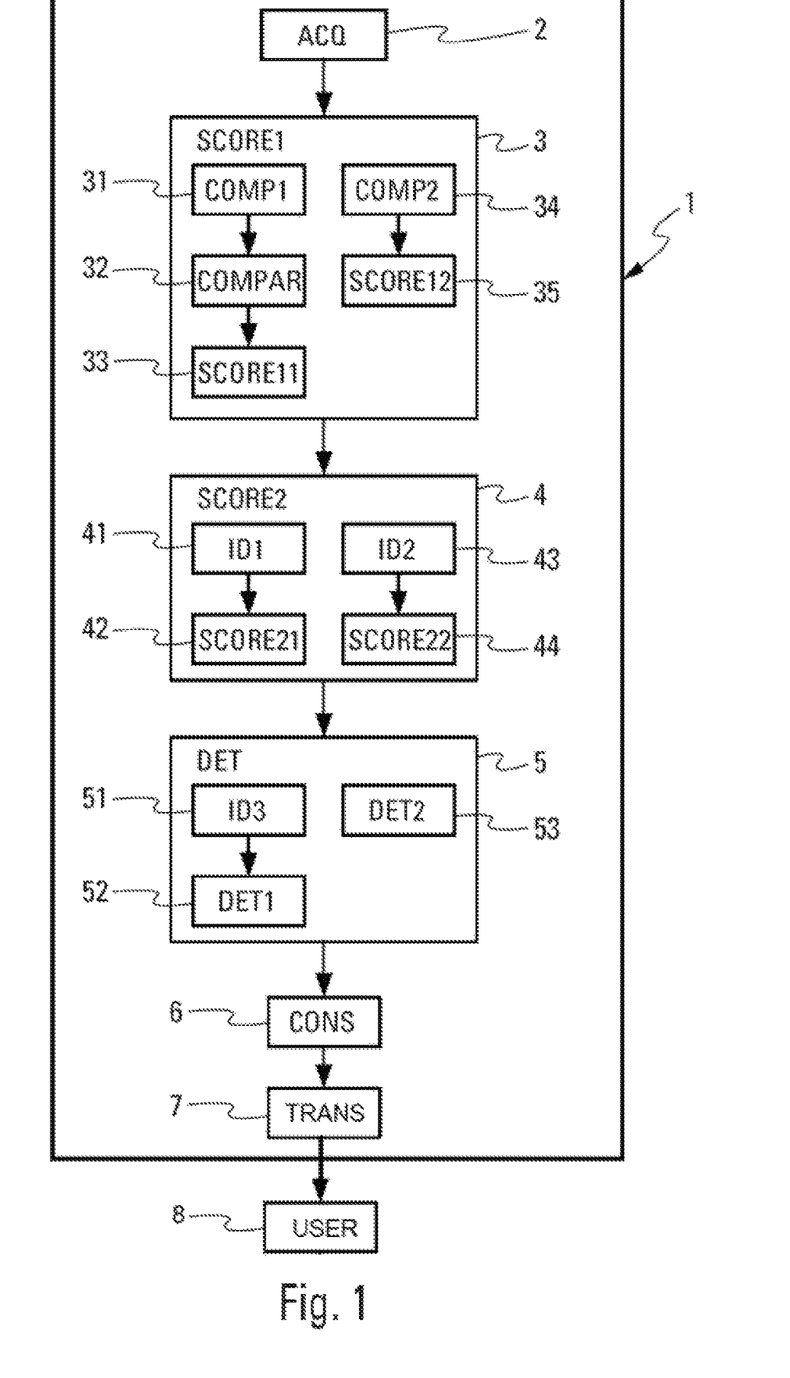
FIG. 1 represents at least one embodiment of the system for merging measurements of flight parameters.
Figure 3:
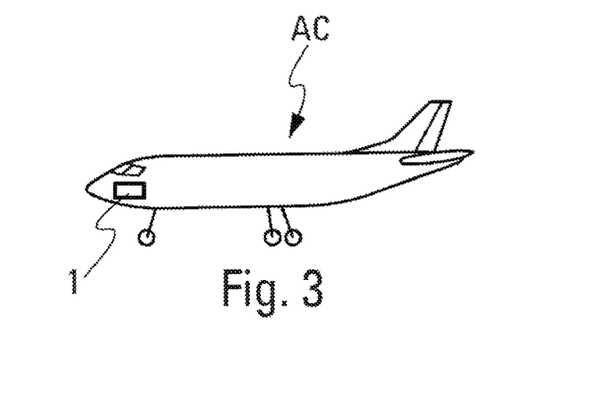
FIG. 3 represents an aircraft embedding the system for merging measurements of flight parameters.

The system for merging measurements of flight parameters 1 of an aircraft AC, hereinafter in the description called "merging system" is represented in FIG. 1.

The measurements of flight parameters are linked to one another by at least one equation with no second term. An equation with no second term takes the form $f(x_1, \ldots, x_i, \ldots, x_n) = 0$ in which $x_1, \ldots, x_i, \ldots, x_n$ correspond to measurements of flight parameters and $f$ corresponds to a function linking the measurements of flight parameters. In this example, the equation links together n measurements of flight parameters that are identical or non-identical originating from sensors that are dissimilar or non-dissimilar.

A same flight parameter measured by dissimilar sensors means that a same flight parameter can be measured by sensors which implement technologies using different physical principles or different integrations. A flight parameter can also be estimated by estimators.

The merging system 1, embedded on the aircraft AC, comprises at least one acquisition module ACQ (ACQ for "acquiring module") 2 configured to acquire at least one measurement of flight parameters. The acquisition module or modules 2 can correspond to one or more sensors or to one or more estimators. Hereinafter in the description, for the purposes of conciseness of the description, the term "measurement of a parameter" denotes both a measurement of the parameter by a sensor and an estimation of the parameter by an estimator.

The merging system 1 further comprises a scoring module SCORE1 (SCORE for "scoring module") 3 configured to attribute respectively a first validity score to the equation or to each of the equations linking the measurements of the flight parameter or parameters to one another.

The first validity score is determined by checking whether the measurement or measurements of the flight parameters are the solution or solutions of the equation or equations. In other words, the scoring module 3 checks whether the measurement or measurements of the flight parameters are a solution of the equation $f(x_1, \ldots x_i, \ldots, x_n) = 0$.

Advantageously, the scoring module 3 comprises a computation submodule COMP1 (COMP for "module for computing") 31 configured to compute an absolute value of a result of the equation from the measurement or measurements of flight parameters involved in the equation. In other words, the computation submodule 31 computes the absolute value of the result of the function $f(x_1, \ldots x_i, \ldots, x_n)$ in which are integrated the measurements corresponding to the flight parameters $x_1, \ldots, x_i, \ldots, x_n$ linked to the function.

The scoring module 3 also comprises:
- a comparison submodule COMPAR (COMPAR for "comparing module") 32 configured to compare the absolute value of the result with at least one predetermined threshold value,
- a scoring submodule SCORE11 33 configured to attribute the first validity score to the equation from the comparison of the absolute value of the result with the predetermined threshold value or values.

Each of the submodules of the scoring module 3 is implemented for each of the equations.

According to a first variant, the attribution of the first validity score by the scoring module 3 follows a Boolean logic. In this first variant, the absolute value of the result is compared with a predetermined threshold value by the comparison submodule 32. The first validity score attributed by the scoring submodule 33 is equal to 1 (or TRUE), if the absolute value of the result is below the predetermined threshold value. The first validity score attributed is equal to 0 (or FALSE), if the absolute value of the result is above or equal to the predetermined threshold value.

According to a second variant, the attribution of the first validity score by the scoring module 3 follows a fuzzy logic. In this second variant, the absolute value of the result is compared with a first predetermined threshold value and a second predetermined threshold value. The first predetermined threshold value is lower than the second predetermined threshold value. The first validity score attributed by the scoring submodule 33 is equal to 1, if the absolute value of the result is below the first predetermined threshold value. The first validity score attributed is equal to 0, if the absolute value of the result is above or equal to the second threshold value. The first validity score attributed is greater than 0 and less than 1, if the absolute value of the result is above or equal to the first predetermined threshold value and if the absolute value of the result is below the second predetermined threshold value, the first validity score attributed is greater than 0 and less than 1 according to a monotonic function decreasing from 1 to 0 as the absolute value of the result increases.

For example, the decreasing monotonic function corresponds to a linear function decreasing from 1 to 0.

Advantageously, if a measurement is not available, the first validity score attributed is equal to 0 for the equation or equations linking the flight parameter for which the measurement is wanted.

According to a variant, the scoring module 3 also comprises:
 a computation submodule COMP2 34 configured to compute a statistical value from a classification method, from the equation or equations and from the measurement or measurements of the flight parameters,
 a scoring submodule SCORE12 35 configured to attribute the first validity score by taking account of the statistical value.

The use of a classification method makes it possible to take account of the statistical characteristics of the measurements involved in the equation or equations to be checked and of the known errors of any models used.

For example, the classification method can correspond to a parametric or non-parametric statistical test, a preliminary low-pass filtering or high-pass filtering, a test of $\chi 2$ over a sliding window. The predetermined threshold is then applied to the result of the test.

When the classification method is a test of $\chi 2$, the statistical value corresponds to $\chi 2 = F_{(t=1)}^2 + F_{(t=2)}^2 + F_{(t=3)}^2 + \ldots + F_{(t=n)}^2$, in which F corresponds to the result of the equation at different instants t. The result F should be zero at each instant t. The test of $\chi 2$ can be applied to the raw result of the equation or to the result filtered, for example, by a low-pass filter.

The merging system further comprises a scoring module SCORE2 4 configured to attribute respectively a second validity score to one or more failure scenarios. Each of the failure scenarios involves one or more acquisition modules 2. A failure scenario corresponds to a combination of failed acquisition modules 2 and/or of acquisition modules 2 providing non-erroneous measurements.

Examples of failure scenarios that can be given are the following scenarios: no failure of the acquisition modules 2, failure of several acquisition modules 2 individually, consistent failure of several acquisition modules 2 for which the measurements are dependent on one another, inconsistent failure of several acquisition modules 2.

The second validity score for a failure scenario considered is determined from the first validity score or scores attributed to the equation or equations linking the flight parameters for which the measurement or measurements are acquired by the acquisition module or modules 2 involved respectively in the failure scenario considered.

According to a first embodiment, the scoring module 4 comprises an identification submodule ID1 (ID for "identifying module") 41 configured to identify, out of the equation or equations, the equation or equations linking the measurements of flight parameters acquired by the acquisition module or modules 2 involved in the failure scenario. Furthermore, the acquisition module or modules 2 identified by the identification submodule 41 correspond to the acquisition module(s) 2 for which the failure scenario assumes that the acquisition module or modules 2 provide non-erroneous measurements. The scoring module 4 also comprises a scoring submodule SCORE21 42 configured to attribute the second validity score as a function of the first validity score of the equation or equations identified by the identification submodule 41. Each of the submodules of the scoring module 4 is implemented for each of the failure scenarios.

According to a first variant of the first embodiment, the attribution of the second validity score by the scoring module 4 follows a Boolean logic. In this first variant, the second validity score attributed by the scoring submodule 42 is equal to 1, if the equation or all the equations identified in the first identification substep have a first validity score attributed equal to 1. The second validity score attributed by the scoring submodule 42 is equal to 0, if at least one of the equations identified by the identification submodule 41 has a first validity score different from 1.

According to a second variant of the first embodiment, the attribution of the second validity score by the scoring module 4 follows a fuzzy logic based on combination by a fuzzy "AND" operator of the first validity scores. Any type of fuzzy rule can be used, such as a probabilistic rule, the Lukasiewicz rule or the Zadeh rule. Preferably, the Zadeh rule is used. Thus, if the Zadeh rule is chosen, the second validity score attributed by the scoring submodule 42 is equal to the minimum value of the first validity score or scores of the equation or equations identified by the identification submodule 41.

According to a second embodiment, the scoring module 4 comprises an identification submodule ID2 43 configured to identify, out of the equations, one or more first equations linking the measurements of flight parameters acquired by the acquisition module or modules involved in the failure scenario and for which the failure scenario assumes that the acquisition module or modules provide non-erroneous measurements, and one or more second equations linking the measurements of flight parameters acquired by the acquisition module or modules involved in the failure scenario and for which the failure scenario assumes that the acquisition module or modules provide erroneous measurements.

The scoring module also comprises a scoring submodule SCORE22 44 configured to attribute the second validity score to each of the failure scenarios from the equation or equations identified by the identification submodule 43.

According to a first variant of the second embodiment, the attribution of the second validity score by the scoring module 4 follows a Boolean logic. In this first variant, the second validity score attributed by the scoring submodule 44 is equal to 1 for the failure scenario or scenarios involving the acquisition module or modules 2 configured to acquire the measurement or measurements of flight parameters linked by the equation or equations identified by the identification submodule 43, if the first equation or equations identified by the identification submodule 43 have a first validity score attributed equal to 1 and if the second equations identified by the identification submodule 43 have a first validity score attributed equal to 0.

The second validity score attributed by the scoring submodule 44 is equal to 0 for the failure scenario or scenarios involving the acquisition module or modules 2 configured to acquire the measurement or measurements of flight parameters linked by the equation or equations which are not identified by the identification submodule 43.

According to a second variant of the second embodiment, in the same way as the second variant of the first embodiment, the attribution of the second validity score by the scoring module 4 follows a fuzzy logic based on combination by a fuzzy "AND" operator of the first validity scores attributed to the first equation or equations linking the flight parameters. Any type of fuzzy rule can be used, such as a probabilistic rule, the Lukasiewicz rule or the Zadeh rule. Preferably, the Zadeh rule is used. Thus, if the Zadeh rule is chosen, the second validity score is equal to the minimum value of the first validity score or scores attributed by the scoring submodule 33 or 35 to the first equation or equations linking the flight parameters, for the failure scenario or scenarios involving one or more acquisition modules 2 configured to acquire the measurement or measurements of flight parameters linked by the first equation or equations identified by the identification submodule 43.

The second validity score is equal to 0, for the failure scenario or scenarios involving none of the acquisition modules 2 configured to acquire the measurement or measurements of flight parameters linked by the first equation or equations identified by the identification submodule 43.

For the two embodiments, when two measurements supplied by non-dissimilar acquisition modules 2 are erroneous at the same time, the second validity score can be obtained by a supplementary combination of all the first validity scores attributed to the equations linking the flight parameters for which the measurements are erroneous.

According to another variant, it is possible to differentiate two scenarios from one another when one scenario assumes several measurements that are identically erroneous while the other scenario assumes the same measurements to be erroneous in different ways. The differentiation of the second score between the two scenarios is obtained by taking account of the equation or equations linking the erroneous measurements. For the scenario assuming several measurements that are identically erroneous, the third score is equal to 1 if the first scores of the equations linking these erroneous measurements are equal to 1. The third score is equal to 0 if the first scores of the equations linking these erroneous measurements are equal to 0.

The merging system 1 also comprises a determination module DET 5 configured to determine the validity of the measurement or measurements of flight parameters from the second validity score or scores.

According to a first variant, the determination module 5 follows a Boolean logic. In this first variant, the determination module 5 comprises the following submodules:
  an identification submodule ID3 51 configured to identify the failure scenario or scenarios involving the acquisition module 2 configured to acquire the flight parameter measurement, for which the second validity score attributed is equal to 1,
  a determination submodule DET1 52 configured to determine the validity of the flight parameter measurement from the failure scenario or scenarios identified by the identification submodule 51.

The flight parameter measurement is valid if there is at least one failure scenario for which the second validity score attributed by the scoring module 4 is equal to 1, otherwise the flight parameter measurement is not valid.

Each of the submodules of the determination module 5 is implemented for each of the measurements of flight parameters.

According to a second variant, the determination module 5 follows a fuzzy logic based on "OR" relationships. Any type of fuzzy rule can be used, such as a probabilistic rule, the Lukasiewicz rule or the Zadeh rule. Preferably, the Zadeh rule is used. Thus, the determination module 5 comprises a determination submodule DET2 53 configured to determine the validity of the measurement of flight parameters. The validity of the measurement of flight parameters is equal to a maximum value of the second validity scores attributed to the failure scenarios involving the acquisition module 2 configured to acquire the flight parameter measurement. The determination submodule 53 is implemented for each of the measurements of flight parameters. In this variant, the validity can be considered as a third validity score, lying between 0 and 1, attributed to each of the measurements of flight parameters.

The merging system 1 also comprises a consolidation module CONS (CONS for "consolidating module") 6 configured to consolidate the measurements of flight parameters.

Consolidating measurements means taking into account the measurements of flight parameters available as a function of the validity of the measurements determined by the determination module 5.

It can involve a simple switching as a function of the validity of the measurements. For example, a first measurement is retained if this first measurement is valid, otherwise, a second measurement is retained if this second measurement is valid, otherwise a third measurement is retained, and so on.

If the consolidation module 6 follows a fuzzy logic (second variant), the consolidation module 6 is configured to compute a weighted average. This weighting is obtained from the third validity scores of each of the measurements of flight parameters by taking account of all the possible combinations.

As an example, consider a flight parameter for which the measurements M1, M2, M3, having $\alpha_1$, $\alpha_2$, $\alpha_3$ for third validity score, are supplied from three acquisition modules 2.

Eight weightings $\beta_1$, $\beta_2$, $\beta_3$, $\beta_4$, $\beta_5$, $\beta_6$, $\beta_7$, $\beta_8$ are defined as follows:

$$\beta_1 = \alpha_1 \times \alpha_2 \times \alpha_3,$$

$$\beta_2 = \alpha_1 \times \alpha_2 \times (1-\alpha_3),$$

$$\beta_3 = \alpha_1 \times (1-\alpha_2) \times \alpha_3,$$

$$\beta_4 = (1-\alpha_1) \times \alpha_2 \times \alpha_3,$$

$$\beta_5 = \alpha_1 \times (1-\alpha_2) \times (1-\alpha_3),$$

$$\beta_6 = (1-\alpha_1) \times \alpha_2 \times (1-\alpha_3),$$

$$\beta_7 = (1-\alpha_1) \times (1-\alpha_2) \times \alpha_3,$$

$$\beta_8 = (1-\alpha_1) \times (1-\alpha_2) \times (1-\alpha_3).$$

$\beta_1$ reveals that the three measurements M1, M2, M3 are valid.
$\beta_2$ reveals that only the measurements M1 and M2 are valid.
$\beta_3$ reveals that only the measurements M1 and M3 are valid.
$\beta_4$ reveals that only the measurements M2 and M3 are valid.
$\beta_5$ reveals that only the measurement M1 is valid.
$\beta_6$ reveals that only the measurement M2 is valid.
$\beta_7$ reveals that only the measurement M3 is valid.
$\beta_8$ reveals that no measurement is valid.
It can be noted that $\Sigma_i \beta_i = 1$.

For each weighting, the consolidation module 6 defines a preestablished consolidated datum $c_i$, such as the median of the three measurements when they are all valid, the average of two measurements when those are valid, etc.

The consolidation module 6 thus computes the measurement of the flight parameter consolidated by the relationship $\Sigma_i \beta_i \times c_i$.

According to another variant, the consolidation module 6 can consolidate the measurements of flight parameters from the second validity score. In this variant, the pre-established consolidated datum is predetermined empirically for each of the failure scenarios. The consolidation weighted average is then the combination of the consolidated data pre-established for each of the failure scenarios weighted by the second validity score. In this variant, it can be necessary to ensure that the sum of the second validity scores is always equal to 1.

Advantageously, when the third validity score of a measurement is equal to 0 for a predetermined time, the measurement is locked with an invalid status. The third validity score will remain blocked at 0, together with all the associated equations, even if the failure of the acquisition module 2 which supplies the measurement seems to disappear. However, it is possible for the status of the measurement to be unlocked, if there is a return to a consistency of the measurements at the end of a predetermined time.

The merging system 1 also comprises a transmission module TRANS (TRANS for "transmitting module") 7 configured to transmit the consolidated measurement or measurements of flight parameters to a user device 8.

The user device 8 can comprise the flight controls or the automatic pilot of the aircraft AC.

Figure 2:
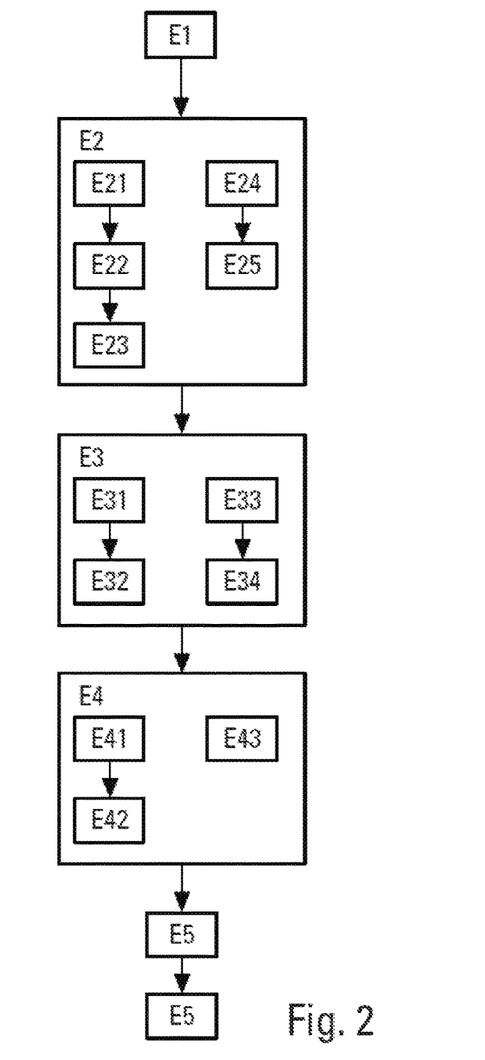
FIG. 2 represents at least one embodiment of the method for merging measurements of flight parameters.

The disclosure herein relates also to a method for merging measurements of flight parameters of an aircraft.

The merging method comprises the following steps:
an acquisition step E1, implemented by the acquisition module or modules 2, consisting in or comprising acquiring at least one measurement of flight parameters;
a scoring step E2, implemented by the scoring module 3, consisting in or comprising attributing respectively a first validity score to the equation or to each of the equations linking the measurements of the flight parameters to one another, the first validity score being determined by checking whether the measurement or measurements of the flight parameter or parameters are a solution or solutions of the equation or equations;
a scoring step E3, implemented by the scoring module 4, consisting in or comprising attributing respectively a second validity score to one or more failure scenarios, each of the failure scenarios involving one or more acquisition modules 2, the second validity score for a failure scenario considered being determined from the second validity score or scores attributed to the equation or equations linking the measurements of the flight parameters acquired by the acquisition module or modules 2 involved respectively in the failure scenario considered;
a determination step E4, implemented by the determination module 5, consisting in or comprising determining the validity of the measurement or measurements of the flight parameter or parameters from the second validity score or scores;
a consolidation step E5, implemented by the consolidation module 6, consisting in or comprising consolidating the measurements of the flight parameter or parameters as a function of the validity of the measurements determined in the determination step E4;
a transmission step E6, implemented by the transmission module 7, consisting in or comprising transmitting the consolidated measurement or measurements of the flight parameter or parameters to the user device 8.

The scoring step E2 can comprise the following substeps, each of the following substeps being implemented for each of the equations:
a computation substep E11, implemented by the computation submodule 31, consisting in or comprising computing an absolute value of a result of the equation with no second term from the measurement or measurements of the flight parameter or parameters involved in the equation;
a comparison substep E12, implemented by the comparison submodule 32, consisting in or comprising comparing the absolute value of the result with at least one predetermined threshold value;
a scoring substep E13, implemented by the scoring submodule 33, consisting in or comprising attributing the first validity score to the equation from the comparison of the absolute value of the result with the predetermined threshold value or values.

According to a variant, the scoring step E2 can comprise:
a computation substep E14, implemented by the computation submodule 34, consisting in or comprising computing a statistical value from a classification method, from the equation or equations and from the measurement or measurements of the flight parameter or parameters,
a scoring substep E15, implemented by the scoring submodule 35, consisting in or comprising attributing the first validity score by taking account of the statistical value.

According to the first embodiment, the scoring step E3 can comprise the following substeps, each of the following substeps being implemented for each of the failure scenarios:
an identification substep E31, implemented by the identification submodule 41, consisting in or comprising identifying, from the equation or equations, the equation or equations linking the measurements of flight parameters acquired by the acquisition module or modules 2 involved in the failure scenario, the acquisition module or modules 2 identified further corresponding to the acquisition module or modules 2 for which the failure scenario assumes that the acquisition module or modules 2 provide non-erroneous measurements,
a scoring substep E32, implemented by the scoring submodule 42, consisting in or comprising attributing the second validity score as a function of the first validity score of the equation or equations identified in the identification substep E31.

According to the second embodiment, the scoring step E3 comprises the following substeps:
an identification substep E33, implemented by the identification submodule 43, consisting in or comprising identifying, out of the equations, one or more first equations linking the measurements of flight parameters acquired by the acquisition module or modules involved in the failure scenario, the acquisition module or modules 2 identified further corresponding to the acquisition module or modules 2 for which the failure scenario assumes that the acquisition module or modules provide non-erroneous measurements, and one or more second equations linking the measurements of flight parameters acquired by the acquisition module or modules involved in the failure scenario and for which the failure scenario assumes that the acquisition module or modules provide erroneous measurements, a scoring substep E34, implemented by the scoring submodule 44, consisting in or comprising attributing the second validity score to each of the failure scenarios from the equation or equations identified in the identification substep E33.

According to a first variant, the determination step E4 comprises the following substeps, each of the following substeps being implemented for each of the measurements of the flight parameter or parameters:

an identification substep E41, implemented by the identification submodule 51, consisting in or comprising identifying the failure scenario or scenarios involving the acquisition module 2 configured to acquire the flight parameter measurement, for which the second validity score attributed is equal to 1, a determination substep E42, implemented by the determination submodule 52, consisting in or comprising determining the validity of the flight parameter measurement from the failure scenario or scenarios identified in the identification substep E41, the flight parameter measurement being valid if there is at least one failure scenario for which the second validity score attributed is equal to 1, otherwise the flight parameter measurement is not valid.

According to a second variant, the determination step E4 comprises a determination substep E43, implemented by the determination submodule 53 for each of the measurements of the flight parameter or parameters, consisting in or comprising determining the validity of the flight parameter measurement, the validity of the flight parameter measurement being equal to a maximum value of the second validity scores attributed to the failure scenarios involving the acquisition module 2 configured to acquire the flight parameter measurement.

Hereinafter in the description, the merging system 1 is applied to three different examples.

Example 1

Take four measurements of a flight parameter corresponding to an anemometric speed, deriving from four acquisition modules 2: three measurements deriving from one and the same measurement technology by three air data reference (ADR) units: $A_1$, $A_2$ and $A_3$ and a dissimilar estimation measurement supplied by a backup estimator B.

The equations linking these measurements of the flight parameter are as follows:

$$A_1 - A_2 = 0 \quad (A12)$$

$$A_1 - A_3 = 0 \quad (A13)$$

$$A_2 - A_3 = 0 \quad (A23)$$

$$A_1 - B = 0 \quad (B1)$$

$$A_2 - B = 0 \quad (B2)$$

$$A_3 - B = 0 \quad (B3)$$

The quantities between parentheses correspond to the first validity scores attributed to the equations.

The failure scenarios considered are:
Everything is valid (TV)
A1 is erroneous (A1S)
A2 is erroneous (A2S)
A3 is erroneous (A3S)
B is erroneous (BS)
A1 and A2 are identically and simultaneously erroneous (C12)
A2 and A3 are identically and simultaneously erroneous (C23)
A1 and A3 are identically and simultaneously erroneous (C13)
A1 and A2 are erroneous in different ways (D12)
A2 and A3 are erroneous in different ways (D23)
A1 and A3 are erroneous in different ways (D13)
A1 and B are erroneous in different ways (D1B)
A2 and B are erroneous in different ways (D2B)
A3 and B are erroneous in different ways (D3B)

The second validity scores of the failure scenarios are as follows:

$$\text{Score}(TV) = \text{MIN}(A12, A13, A23, B1, B2, B3)$$

$$\text{Score}(A1S) = \text{MIN}(A23, B2, B3)$$

$$\text{Score}(A2S) = \text{MIN}(A13, B1, B3)$$

$$\text{Score}(A3S) = \text{MIN}(A12, B1, B2)$$

$$\text{Score}(BS) = \text{MIN}(A12, A13, A23)$$

$$\text{Score}(C12) = \text{MIN}(A12, B3)$$

$$\text{Score}(C23) = \text{MIN}(A23, B1)$$

$$\text{Score}(C13) = \text{MIN}(A13, B2)$$

$$\text{Score}(D12) = \text{MIN}(\underline{A12}, B3), \text{ where } \underline{A12} = 1 - A12$$

$$\text{Score}(D23) = \text{MIN}(\underline{A23}, B1), \text{ where } \underline{A23} = 1 - A23$$

$$\text{Score}(D13) = \text{MIN}(\underline{A13}, B2), \text{ where } \underline{A13} = 1 - A13$$

$$\text{Score}(D1B) = \text{MIN}(A23, \underline{B1}), \text{ where } \underline{B1} = 1 - B1$$

$$\text{Score}(D2B) = \text{MIN}(A13, \underline{B2}), \text{ where } \underline{B2} = 1 - B2$$

$$\text{Score}(D3B) = \text{MIN}(A12, \underline{B3}), \text{ where } \underline{B3} = 1 - B3$$

Let $a_1$, $a_2$, $a_3$ and $b$ be the third validity scores of the measurements to be defined.

These have the values:

$$a_1 = \text{MAX}(TV, A2S, A3S, BS, C23, D23, D2B, D3B)$$

$$a_2 = \text{MAX}(TV, A1S, A3S, BS, C13, D13, D1B, D3B)$$

$$a_3 = \text{MAX}(TV, A1S, A2S, BS, C12, D12, D1B, D2B)$$

$$b = \text{MAX}(TV, A1S, A2S, A3S, C12, D12, C13, D13, C23, D23)$$

Finally, the consolidated datum at an instant k has the value:

$$Vc(k) = a_1 \times a_2 \times a_3 \times \text{median}(A_1, A_2, A_3) + (1-a_1) \times a_2 \times a_3 \times \text{average}(A_2, A_3) + a_1 \times (1-a_2) \times a_3 \times \text{average}(A_1, A_3) + a_1 \times a_2 \times (1-a_3) \times \text{average}(A_1, A_2) + (1-a_1) \times (1-a_2) \times a_3 \times b \times A_3 + (1-a_1) \times a_2 \times (1-a_3) \times b \times A_2 + a_1 \times (1-a_2) \times (1-a_3) \times b \times A_1 + (1-\text{sum of the weighting coefficients}) \times Vc(k-1).$$

Example 2

The purpose of this example is to increase the availability and the integrity of an approach by touchdown point (TDP) of the aircraft AC.

For the acquisition modules 2, the following sensors and parameters are considered:
- a geolocation module, such as a GPS (Global Positioning System) module for measuring a GPS position,
- an inertial unit or IRS (Inertial Measurement System) module for measuring the pitch, roll and heading angles and an inertial speed,
- radio altimeters for measuring a height,
- a runway database RDB for acquiring the coordinates of runways (latitude, longitude, altitude, magnetic orientation of runway or QFU),
- a terrain database TDB for acquiring terrain data,
- a first source CAM, such as a camera, for acquiring a designation from the pilot of a position (xpix, ypix) on a screen of the TDP, and a plot of the axis from the touchdown point,
- a second IRS module, denoted IRSB, for measuring the pitch $\Theta$, roll $\Phi$ and heading $\Psi$ angles,
- a second source CAM, such as a camera, denoted CAMB, for acquiring a designation from the pilot of a position of the TDP, and of the plot of the axis from the touchdown point.

Apart from the database which combines TDB and RDB, it is initially considered that these acquisition modules 2 are all dissimilar, in particular:
- the dependency between the inertial speeds and the GPS module is not taken into account, it is assumed low;
- the IRSB module is assumed to be sufficiently accurate without being assisted by the GPS module,
- the two CAM sources are dissimilar.

In addition, it is assumed that it is not possible to compute an IRS position by integration of the inertial speeds without disregarding the dependency of the initial position. It will therefore be assumed here that the positions measured by the IRS module and the GPS module are not dissimilar.

Two other acquisition modules can be used:
- a rangefinder for measuring a distance to the terrain in front of the aircraft AC and the distance to the touchdown point,
- image analysis algorithms, denoted IBL for Image Base Landing, which make it possible to recognize the runway and assess the distance to the runway.

The acquisition modules 2 listed above make it possible to acquire measurements of the following flight parameters:
- latlongGPS: GPS latitude $lat_{GPS}$ and GPS longitude $long_{GPS}$,
- altGPS: a GPS altitude,
- VxyIRS: a lateral IRS inertial speed,
- VzIRS: a vertical IRS inertial speed,
- hRA: a height from radio altimeters RA,
- zDB: a profile of the terrain database TDB,
- phithetaIRS and phithetaIRSB: IRS and IRSB roll and pitch angles $\Phi$ and $\Theta$,
- psiIRS and psiIRB: IRS and IRSB heading angles $\Psi$,
- angIRS and angIRSB: IRS and IRSB pitch $\Theta$, roll $\Phi$ and heading $\Psi$,
- posRDB and QFURDB: a position and a QFU of the runway of the RDB database,
- rCAM and rCAMb: positions of the TDP on the screen of CAM and CAMB,
- trackCAM and trackCAMb: the plots of the TDP axes designated by CAM and CAMB,
- distTLM: a distance measured by the rangefinder,
- ofCAM and ofCAMB: a video output of the cameras which fit in as input for the optical stream algorithms.

The equations linking the measurements of the parameters listed above can be defined as follows.

The equations (1.1) and (1.2) correspond to a comparison between the GPS measurements and the IRS measurements.

$$f(\text{latlongGPS}, \text{VxyIRS}) = (X_{GPS}, Y_{GPS}) - f(V_{XIRS}, V_{YIRS}) = 0 \quad (1.1)$$

in which the GPS coordinates ($X_{GPS}$, $Y_{GPS}$) can be defined in a runway reference frame from the data ($lat_{GPS}$, $long_{GPS}$) of the aircraft AC, and in which the IRS coordinates are obtained by integration of the inertial speeds ($V_{XIRS}$, $V_{YIRS}$) with a GPS initialization.

$$f(\text{altGPS}, \text{VzIRS}) = Z_{GPS} - fV_{ZIRS} = 0 \quad (1.2)$$

which is a comparison of the GPS altitude $Z_{GPS}$ with the integration of the inertial speed VzIRS with a GPS initialization.

The equation (2.1) corresponds to the use of the radio altimeter.

$$f(\text{altGPS}, hRA, zDB) = Z_{GPS} - H_{RA} - Z_{TDB}(X_{GPS}, Y_{GPS}) = 0 \quad (2.1)$$

which is a comparison of the GPS altitude $Z_{GPS}$ with the sum of the altitude of the terrain $Z_{TDB}$ and of the height RA $H_{RA}$ of the aircraft AC.

The equations (3.1) and (3.2) correspond to a designation of the pilot.

$$f(posGPS, angIRS, rCAM, RDB) = \begin{pmatrix} x_{pix} \\ y_{pix} \end{pmatrix}_{CAM} - R_{IRS} \begin{pmatrix} X \\ Y \\ Z \end{pmatrix}_{GPS-RDB} = 0. \quad (3.1)$$

which is a comparison of the pilot designation (x/z, y/z) with the runway position of the DB by using the GPS aeroplane position and the IRS angles.

$$f(\text{QFUDB}, \text{trackCAM}, \text{psiIRS}) = QFU_{DB} - \text{track}_{DB} - \Psi_{IRS} = 0 \quad (3.2)$$

which is a comparison of the QFU of the runway of the database $QFU_{DB}$ with the track $track_{DB}$ designated by the pilot on the CAM source by using the IRS heading angle $\Psi_{IRS}$.

The equation (4.1) corresponds to the consistency of the database RDB.

$$f(zDB, posRDB) = Z_{TDB}(X_{RDB}, Y_{RDB}) - Z_{RDB} = 0 \quad (4,1)$$

which is a comparison of the altitude of the runway with the altitude of the terrain $Z_{TDB}$ at runway (X,Y). This equation compares measurements of parameters which are not independent because they come from the database. It is therefore considered that it is possible to then check that the database is erroneous.

The equations (5.1), (5.2), (5.3) and (5.4) correspond to the pilot designation sources CAM and CAMB.

$$f(rCAM, rCAMB) = \begin{pmatrix} x_{pix} \\ y_{pix} \end{pmatrix}_{CAM} - \begin{pmatrix} x_{pix} \\ y_{pix} \end{pmatrix}_{CAMb} = 0 \quad (5.1)$$

which is a comparison of the pilot designations (x/z, y/z) between the two sources CAM and CAMB.

$$f(\text{trackCAM}, \text{trackCAMB}) = \text{track}_{CAMb} - \text{track}_{CAM} = 0 \quad (5.2)$$

which corresponds to a comparison of the tracks track$_{CAM}$ and track$_{CAMb}$ designated by the pilot between the two sources CAM and CAMB.

$$f(posGPS, angIRS, rCAMB, RDB) = \qquad (5.3)$$

$$\begin{pmatrix} x_{pix} \\ y_{pix} \end{pmatrix}_{CAMb} - R_{IRS} \begin{pmatrix} \begin{pmatrix} X \\ Y \\ Z \end{pmatrix}_{GPS\text{-}RDB} \end{pmatrix} = 0$$

which corresponds to a comparison of the pilot designation (x/z, y/z) on the second source CAMB, with the runway position of the DB by using the GPS position and the IRS angles.

$$f(QFUDB, trackCAMB, psiIRS) = QFU_{DB} - track_{CAMB} - \Psi_{IRS} = 0 \qquad (5.4):$$

which corresponds to a comparison of the QFU of the runway of the database QFU$_{DB}$ with the track track$_{CAMB}$ designated by the pilot on the source CAMB by using the IRS angles Φ and Θ.

The equations (6.1) to (6.6) correspond to a use of a second IRS technology.

$$f(phithetaIRS, pliithetaIRSB) = (\Phi, \Theta)_{IRSB} - (\Phi, \Theta)_{IRS} = 0 \qquad (6.1)$$

which corresponds to a comparison of the angles Φ and Θ between the IRS module and the IRSB module.

$$f(psiIRS, psiIRSB) = \Psi_{IRSB} - \Psi_{IRS} = 0 \qquad (6.2):$$

which corresponds to a comparison of the angle Ψ between the IRS module and the IRSB module.

$$f(posGPS, angIRSB, rCAM, RDB) = \qquad (6.3)$$

$$\begin{pmatrix} x_{pix} \\ y_{pix} \end{pmatrix}_{CAM} - R_{IRSB} \begin{pmatrix} \begin{pmatrix} X \\ Y \\ Z \end{pmatrix}_{GPS\text{-}RDB} \end{pmatrix} = 0$$

which corresponds to a comparison of the pilot designation (x/z, y/z) on the first source CAM, with the runway position of the DB by using the GPS position and the IRSB angles.

$$f(QFUDB, trackCAM, psiIRSB) = QFU_{DB} - track_{CAM} - \Psi_{IRSB} = 0 \qquad (6.4):$$

which corresponds to a comparison of the QFU of the runway of the database QFU$_{DB}$ with the track track$_{CAM}$ designated by the pilot on the source CAM by using the IRSB angles Ψ and Θ.

$$f(posGPS, angIRSB, rCAMB, RDB) = \qquad (6.5)$$

$$\begin{pmatrix} x_{pix} \\ y_{pix} \end{pmatrix}_{CAMb} - R_{IRSB} \begin{pmatrix} \begin{pmatrix} X \\ Y \\ Z \end{pmatrix}_{GPS\text{-}RDB} \end{pmatrix} = 0$$

which corresponds to a comparison of the pilot designation (x/z, y/z) on the second source CAMB, with the runway position of the DB by using the GPS position and the IRSB angles.

$$f(QFUDB, trackCAMB, psiIRSB) = QR_{DB} - track_{CAMB} - track_{CAMB} - \Psi_{IRSB} = 0 \qquad (6.6):$$

which corresponds to a comparison of the QFU of the runway of the database QFU$_{DB}$ with the track track$_{CAMB}$ designated by the pilot on the source CAMB by using the IRSB angles Φ and Θ.

The equations (7.1) to (7.16) correspond to uses of the rangefinder.

The first use of the rangefinder makes it possible to assess the distance to the ground in front of the aircraft AC.

From the angles of the aircraft AC and from its IRS speed or speed recomputed from the GPS position, the rangefinder makes it possible to assess the distance to the ground in front of the aircraft and in particular the height of the aircraft AC $H_{(TLM/(IRS\ or\ GPS)/IRSX)}$. This height can be compared to the height of the radio altimeters $H_{RA}$ or to the difference between the GPS altitude and the terrain altitude, $Z_{GPS} - Z_{TDB}(X_{GPS}, Y_{GPS})$ Hence the following equations:

$$f(distTLM, vIRS, angIRS, RA) = H_{TLM/IRS} H_{RA} = 0 \qquad (7.1):$$

$$f(distTLM, vIRS, angIRSB, RA) = H_{TLM/IRS/IRSB} - H_{RA} = 0 \qquad (7.2):$$

$$f(distTLM, vIRS, angIRS, pGPS, zTDB) = H_{TLM/IRS} - Z_{GPS} + Z_{TDB}(X_{GPS}, Y_{GPS}) = 0 \qquad (7.3):$$

$$f(distTLM, vIRS, angIRSB, pGPS, zTDB) = H_{TLM/IRS/IRSB} - Z_{GPS} + Z_{TDB}(X_{GPS}, Y_{GPS}) = 0 \qquad (7.4):$$

$$f(distTLM, pGPS, angIRS, RA) = _{TLM/GPS/IRS} - H_{RA} = 0 \qquad (7.5):$$

$$f(distTLM, pGPS, angIRSB, RA) = H_{TLM/GPS/IRSB} - H_{RA} = 0 \qquad (7.6):$$

$$f(distTLM, pGPS, angIRS, zTDB) = H_{TLM/GPS/IRS} - Z_{GPS} + Z_{TDB}(X_{GPS}, Y_{GPS}) = 0 \qquad (7.7):$$

$$f(distTLM, pGPS, angIRSB, zTDB) = H_{TLM/GPS/IRSB} - Z_{GPS} + Z_{TDB}(X_{GPS}, Y_{GPS}) = 0 \qquad (7.8):$$

The second use of the rangefinder makes it possible to assess the distance between the aircraft AC and the runway.

The distance $D_{(TLM/CAMX/GPS/IRSX)}$ measured by the rangefinder (distTLM) in the direction of the designation (rCAM or rCAMB) of the TDP updated by using the IRS angles (angIRS or angIRSB) and the IRS speed or the GPS position (pGPS), can be compared with the distance between the GPS position (pGPS) and:

the runway position from the database (pRDB), or the position of the TDP obtained by forming the intersection between the designation (rCAM or rCAMB) and the terrain profile (zTDB) from the database.

These distances are denoted $$\left\| \begin{pmatrix} X \\ Y \\ Z \end{pmatrix}_{GPS\text{-}RDB} \right\| \text{ and } \left\| \begin{pmatrix} X \\ Y \\ Z \end{pmatrix}_{GPS/CAMX/TDB} \right\|.$$

Hence the following equations:

$$f(distTLM, pGPS, angIRS, rCAM, pRDB) = \qquad (7.9)$$

$$D_{TLM/CAM/GPS/IRS} - \left\| \begin{pmatrix} X \\ Y \\ Z \end{pmatrix}_{GPS\text{-}RDB} \right\| = 0$$

-continued $$f(distTLM, pGPS, angIRS, rCAM, zTDB) = \qquad (7.10)$$

$$\left\| D_{TLM/CAM/GPS/IRS} - \left\| \begin{pmatrix} X \\ Y \\ Z \end{pmatrix}_{GPS/CAM/TDB} \right\| \right\| = 0$$

$$f(distTLM, pGPS, angIRS, rCAM, pRDB) = \qquad (7.11)$$

$$\left\| D_{TLM/CAMB/GPS/IRS} - \left\| \begin{pmatrix} X \\ Y \\ Z \end{pmatrix}_{GPS-RDB} \right\| \right\| = 0$$

$$f(distTLM, pGPS, angIRS, rCAMB, zTDB) = \qquad (7.12)$$

$$\left\| D_{TLM/CAMB/GPS/IRS} - \left\| \begin{pmatrix} X \\ Y \\ Z \end{pmatrix}_{GPS/CAMB/TDB} \right\| \right\| = 0$$

$$f(distTLM, pGPS, angIRSB, rCAM, pRDB) = \qquad (7.13)$$

$$\left\| D_{TLM/CAM/GPS/IRSB} - \left\| \begin{pmatrix} X \\ Y \\ Z \end{pmatrix}_{GPS-RDB} \right\| \right\| = 0$$

$$f(distTLM, pGPS, angIRSB, rCAM, zTDB) = \qquad (7.14)$$

$$\left\| D_{TLM/CAM/GPS/IRSB} - \left\| \begin{pmatrix} X \\ Y \\ Z \end{pmatrix}_{GPS/CAM/TDB} \right\| \right\| = 0$$

$$f(distTLM, pGPS, angIRSB, rCAMB, pRDB) = \qquad (7.15)$$

$$\left\| D_{TLM/CAMB/GPS/IRSB} - \left\| \begin{pmatrix} X \\ Y \\ Z \end{pmatrix}_{GPS-RDB} \right\| \right\| = 0$$

$$f(distTLM, pGPS, aIRSB, rCAMB, zTDB) = \qquad (7.16)$$

$$\left\| D_{TLM/CAMB/GPS/IRSB} - \left\| \begin{pmatrix} X \\ Y \\ Z \end{pmatrix}_{GPS/CAMB/TDB} \right\| \right\| = 0$$

The equations (8.1) to (8.16) correspond to uses of image based landing (IBL). Here, the relationships between the sources are established theoretically. The equations are not explained.

The use of IBL to compare the two optical streams (ofCAM and ofCAMB) by using the IRS angles (angIRS or angIRSB) and the speed of the aircraft (inertial or derived from the GPS, pGPS) leads to the following equations:

$$f(vIRS, angIRS, ofCAM, ofCAMB) = 0 \qquad (8.1):$$

$$f(vIRS, angIRSB, ofCAM, ofCAMB) = 0 \qquad (8.2):$$

$$f(pGPS, angIRS, ofCAM, ofCAMB) = 0 \qquad (8.3):$$

$$f(pGPS, angIRSB, ofCAM, ofCAMB) = 0. \qquad (8.4):$$

For a use of IBL to assess the distance between the aircraft AC and the runway, the equations are the same as for the rangefinder by substituting the rangefinder distance for the distance computed from the optical streams from the IRS angles (aIRS or aIRSB) and from the IRS or GPS speed.

$$f(pGPS, angIRS, rofCAM, pRDB) = 0 \qquad (8.5):$$

$$f(pGPS, angIRSB, rofCAM, pRDB) = 0 \qquad (8.6):$$

$$f(pGPS, angIRS, rofCAMB, pRDB) = 0 \qquad (8.7):$$

$$f(pGPS, angIRSB, rofCAMB, pRDB) = 0 \qquad (8.8):$$

$$f(pGPS, angIRS, rofCAM, TDB) = 0 \qquad (8.9):$$

$$f(pGPS, angIRSB, rofCAM, TDB) = 0 \qquad (8.10):$$

$$f(pGPS, angIRS, rofCAMB, TDB) = 0 \qquad (8.11):$$

$$f(pGPS, angIRSB, rofCAMB, TDB) = 0 \qquad (8.12):$$

In addition, the pilot designation and the distance to the runway computed by the IBL make it possible to locate the aircraft AC relative to the runway and therefore, by using the database, to compute the height of the aircraft AC relative to the terrain. This height can be compared to the height from the radio altimeters:

$$f(vIRS, angIRS, rofCAM, RDB, TDB, RA) = 0 \qquad (8.13):$$

$$f(vIRS, angIRSB, rofCAM, RDB, TDB, RA) = 0 \qquad (8.14):$$

$$f(vIRS, angIRS, rofCAMB, RDB, TDB, RA) = 0 \qquad (8.15):$$

$$f(vIRS, angIRSB, rofCAMB, RDB, TDB, RA) = 0. \qquad (8.16):$$

From the equations, a score between 0 and 1 is computed using a function of mass (for which the threshold and the slope are set). When an equation is borne out to within a certain degree of accuracy, its mass is equal to 1 and it is deduced therefrom that the parameters are mutually consistent.

That is not always sufficient to guarantee that the measurements of parameters used in the equation are all correct or that the sources which transmit these parameters have not failed. For example, the equation (3.1) deriving from the pilot designation of the TDP makes it possible only to check that the GPS position of the aeroplane is in the runway designation axis. The equation may be borne out and the GPS position false but always within the cone of accuracy about the designation axis.

A first step of the consolidation consists in or comprises computing scores for each of the scenarios of total loss of a source. The score of the GPS failure scenario is the minimum value of the masses of the equations not using the GPS parameter. This score is denoted sc(GPSfault).

For example for an architecture in which the IBL is not used, the GPS failure score is:

$$sc(\text{GPSfault}) = \min(m_{32}, m_{41}, m_{51}, m_{52}, m_{54}, m_{61}, m_{62}, m_{64},$$
$$m_{66}, m_{71}, m_{72}, m_{77}, m_{78}) \text{ with } m_{ij} \text{ the function of}$$
$$\text{mass of the equation } (i \cdot j).$$

The score of a source A is the maximum of the loss scenario scores of the other sources for which the parameters of the source A can still be observed, that is to say, the score of the failure scenario drops to zero in case of failure of the source A.

The observability of the GPS failures is detailed for example in the following paragraph.

The comparison with the IRS inertial speeds, equations (1.1) and (1.2), does not make it possible to detect a GPS bias or a slow drift. To cover them, it is therefore necessary to add the equation (2.1) or (3.1) to the equations (1.1) and (1.2) for example. The following sets of equations are obtained:

(1.1), (1.2) and (2.1) by using the sources IRS, RA and DB:

$$\begin{cases} (X_{GPS}, Y_{GPS}) = \int (V_{XIRS}, V_{YIRS}) \\ Z_{GPS} = \int V_{ZIRS} \\ Z_{GPS} = H_{RA} + Z_{TDB}(X_{GPS}, Y_{GPS}) \end{cases}$$

(1.1), (1.2) and (3.1) by using the sources IRS, DB and CAM:

$$\begin{cases} (X_{GPS}, Y_{GPS}) = \int (V_{XIRS}, V_{YIRS}) \\ Z_{GPS} = \int V_{ZIRS} \\ \begin{pmatrix} x_{pix} \\ y_{pix} \end{pmatrix}_{CAM} = R_{IRS} \begin{pmatrix} \begin{pmatrix} X \\ Y \\ Z \end{pmatrix}_{GPS-RDB} \end{pmatrix} \end{cases}$$

(2.1) and (3.1) by using the sources RA, DB, CAM and IRS:

$$\begin{cases} Z_{GPS} = H_{RA} + Z_{TDB}(X_{GPS}, Y_{GPS}) \\ \begin{pmatrix} x_{pix} \\ y_{pix} \end{pmatrix}_{CAM} = R_{IRS} \begin{pmatrix} \begin{pmatrix} X \\ Y \\ Z \end{pmatrix}_{GPS-RDB} \end{pmatrix} \end{cases}$$

(2.1) and (6.3) by using the sources RA, DB, CAM and IRSB:

$$\begin{cases} Z_{GPS} = H_{RA} + Z_{TDB}(X_{GPS}, Y_{GPS}) \\ \begin{pmatrix} x_{pix} \\ y_{pix} \end{pmatrix}_{CAM} = R_{IRS} \begin{pmatrix} \begin{pmatrix} X \\ Y \\ Z \end{pmatrix}_{GPS-RDB} \end{pmatrix} \end{cases}$$

Hereinbelow, an example of architecture denoted H3 is described, composed of the GPS and IRS sensors (angles and inertial speeds), radio altimeters, dissimilar IRS sensors (angles), a rangefinder (terrain distance and TDP distance), a runway position database (RDB), a terrain database (TDB) and two dissimilar pilot designations CAM and CAMB.

The computation of the failure scenario scores for total loss of a source is obtained by taking the minimum value of the masses of the equations not using the parameters deriving from the source concerned:

$sc(\text{GPSfault}) = \min(m_{32}, m_{41}, m_{51}, m_{52}, m_{54}, m_{61}, m_{62}, m_{64}, m_{66}, m_{71}, m_{72}, m_{77}, m_{78})$, $sc(\text{IRSfault}) = \min(m_{21}, m_{41}, m_{51}, m_{52}, m_{63}, \ldots, m_{66}, m_{76}, m_{713}, \ldots, m_{716})$, $sc(\text{IRSBfault}) = \min(m_{11}, m_{12}, m_{21}, m_{32}, m_{41}, m_{51}, m_{52}, m_{71}, m_{73}, m_{75}, m_{77}, m_{79}, \ldots, m_{712})$ $SC(\text{RAfault}) = \min(m_{11}, m_{12}, m_{31}, m_{32}, m_{41}, m_{51}, \ldots, m_{54}, m_{61}, \ldots, m_{66}, m_{73}, m_{74}, m_{77}, \ldots, m_{716})$, $sc(\text{CAMfault}) = \min(m_{11}, m_{12}, m_{21}, m_{41}, m_{61}, m_{62}, m_{65}, m_{66}, m_{71}, \ldots, m_{78}, m_{711}, m_{712}, m_{715}, m_{716})$, $sc(\text{CAMBfault}) = \min(m_{11}, m_{12}, m_{21}, m_{31}, m_{32}, m_{41}, m_{61}, \ldots, m_{64}, m_{71}, \ldots, m_{710}, m_{713}, m_{714})$ $sc(\text{DBfault}) = \min(m_{11}, m_{12}, m_{51}, m_{52}, m_{61}, m_{62}, m_{71}, m_{72}, m_{75}, m_{76})$, $sc(\text{TLMfault}) = \min(m_{11}, m_{12}, m_{21}, m_{31}, m_{32}, m_{41}, m_{51}, \ldots, m_{54}, m_{61}, \ldots, m_{66})$.

The score of a source is the maximum of the scores of the failure scenarios of the other sources.

$sc(GPS) = \max(sc(\text{IRSfault}), sc(\text{IRSBfault}), sc(\text{RAfault}), sc(\text{CAMfault}), sc(\text{CAMBfault}), sc(\text{TLMfault}))$, $sc(IRS) = \max(sc(\text{GPSfault}), sc(\text{IRSBfault}), sc(\text{RAfault}), sc(\text{DBfault}), sc(\text{CAMfault}), sc(\text{CAMBfault}), sc(\text{TLMfault}))$, $sc(IRSB) = \max(sc(\text{GPSfault}), sc(\text{IRSfault}), sc(\text{RAfault}), sc(\text{DBfault}), sc(\text{CAMfault}), sc(\text{CAMBfault}), sc(\text{TLMfault}))$, $sc(RA) = \max(sc(\text{GPSfault}), sc(\text{IRSfault}), c(\text{IRSBfault}), sc(\text{DBfault}), sc(\text{CAMfault}), sc(\text{CAMBfault}), sc(\text{TLMfault}))$, $sc(TDB) = \max(sc(\text{IRSfault}), sc(\text{IRSBfault}), sc(\text{RAfault}), sc(\text{CAMfault}), sc(\text{CAMBfault}), sc(\text{TLMfault}))$, $sc(RDB) = \max(sc(\text{IRSfault}), c(\text{IRSBfault}), sc(\text{RAfault}), sc(\text{CAMfault}), sc(\text{CAMBfault}), sc(\text{TLMfault}))$, $sc(CAM) = \max(sc(\text{GPSfault}), sc(\text{IRSfault}), sc(\text{IRSBfault}), sc(\text{RAfault}), sc(\text{DBfault}), sc(\text{CAMBfault}), sc(\text{TLMfault}))$, $sc(CAMB) = \max(sc(\text{GPSfault}), sc(\text{IRSfault}), sc(\text{IRSBfault}), sc(\text{RAfault}), sc(\text{DBfault}), sc(\text{CAMfault}), sc(\text{TLMfault}))$, $sc(TLM) = \max(sc(\text{GPSfault}), sc(\text{IRSfault}), sc(\text{IRSBfault}), sc(\text{RAfault}), sc(\text{DBfault}), sc(\text{CAMfault}), sc(\text{CAMBfault}))$.

The flight parameters are then consolidated as a function of the scores of each of the sources.

Example 3

The purpose of this example is to improve an aircraft approach. One of the main critical flight parameters to be measured during an approach phase is the height H: the relative altitude between the aircraft AC and the ground under the aircraft AC. This height H is monitored throughout the approach in order to ensure that there is still enough margin with the ground. This height H is used by the control laws during the flare to produce a nominal touchdown.

It is considered that X is the horizontal distance to the runway threshold and Z is the vertical distance to the runway threshold.

The flight parameters to be measured are as follows:
$H_{RA1}$ and $H_{RA2}$, the vertical distances relative to the ground measured by a radio altimeter 1 and a radio altimeter 2, respectively,
$X_{GPS}$ and $Z_{GPS}$, the relative GPS positions relative to the runway threshold,
$V_{XIRS}$ and $V_{ZIRS}$, the IRS inertial speeds of the aircraft AC, $X_{IRS}$ and $Z_{IRS}$, the IRS positions of the aircraft AC determined by integration from the IRS inertial speeds, $\tan(\gamma_{GS})=Z_{aircraft}/X_{aircraft}$, the angle of position of the aircraft AC between the runway threshold and a horizontal plane supplied by the deflection angle of the instrument landing system ILS, $Z_T(X)$, a terrain altitude for a given distance relative to the runway threshold, supplied by the terrain database TDB, $Z_R+\Delta Z_{GPS}$ and $Z_R+\Delta Z_{IRS}$, heights computed from radar measurements, GPS measurements and IRS measurements.

The equations linking the measurements of the flight parameters are as follows:

$$H_{RA1}+H_{RA2}=0 \quad (RA)$$

$$Z_{GPS}-H_{RA1}-Z_T(X_{GPS})=0 \quad (GT1)$$

$$Z_{GPS}-H_{RA2}-Z_T(X_{GPS})=0 \quad (GT2)$$

$$Z_{IRS}-H_{RA1}-Z_T(X_{IRS})=0 \quad (IT1)$$

$$Z_{IRS}-H_{RA2}-Z_T(X_{IRS})=0 \quad (IT2)$$

$$X_{GPS}-X_{IRS}=0 \text{ and } Z_{GPS}-Z_{IRS}=0 \quad (GI)$$

$$Z_{GPS}-X_{GPS}\tan(\gamma_{GS})=0 \quad (GS)$$

$$Z_{IRS}-X_{IRS}\tan(\gamma_{GS})=0 \quad (IS)$$

$$X_{GPS}\tan(\gamma_{GS})-H_{RA1}-Z_T(X_{GPS})=0 \quad (GST1)$$

$$X_{GPS}\tan(\gamma_{GS})-H_{RA2}-Z_T(X_{GPS})=0 \quad (GST2)$$

$$X_{IRS}\tan(\gamma_{GS})-H_{RA1}-Z_T(X_{IRS})=0 \quad (IST1)$$

$$X_{IRS}\tan(\gamma_{GS})-H_{RA2}-Z_T(X_{IRS})=0 \quad (IST2)$$

$$Z_R+\Delta Z_{GPS}-H_{RA1}=0 \quad (RG1)$$

$$Z_R+\Delta Z_{GPS}-H_{RA2}=0 \quad (RG2)$$

$$Z_R+\Delta Z_{IRS}-H_{RA1}=0 \quad (RI1)$$

$$Z_R+\Delta_{IRS}-H_{RA2}=0 \quad (RI2)$$

$$X_{GPS}\tan(\gamma_{GS})-Z_R-\Delta Z_{GPS}-Z_T(X_{GPS})=0 \quad (GSTR)$$

$$X_{IRS}\tan(\gamma_{GS})-Z_R-\Delta Z_{IRS}-Z_T(X_{IRS})=0 \quad (ISTR)$$

A first validity score lying between 0 and 1 is attributed respectively to each of these equations.

The failure scenarios and the second validity scores S attributed respectively to the failure scenarios are defined as follows by following the Zadeh rule:

All the measurements are not erroneous:
S0=min(all the first validity scores).

That means that the second validity score S0 is equal to the minimum value of all the first validity scores.

Only the measurement of the radio altimeter 1 is erroneous:

S1=min(all the first scores except those of the equations *RA,GT1,IT1,GST1,IST1,RG1* and *RI1*).

That means that the second validity score S1 is equal to the minimum value of all the first validity scores, without taking account of the first validity scores of the equations RA, GT1, IT1, GST1, IST1, RG1 and RI1.

Only the measurement of the radio altimeter 2 is erroneous:

S2=min(all the first scores except those of the equations *RA,GT2,IT2,GST2,IST2,RG2* and *R12*), That means that the second validity score S2 is equal to the minimum value of all the first validity scores, without taking account of the first validity scores of the equations RA, GT2, IT2, GST2, IST2, RG2 and RI2.

The measurements of the radio altimeters 1 and 2 are erroneous:

S12=min(scores of the equations *GI,GS,IS,*GSTR and ISTR).

That means that the second validity score 512 is equal to the minimum value of the first validity scores of the equations GI, GS, IS, GSTR and ISTR.

Only the GPS measurement is erroneous:

SG=min(all the first scores except those of the equations *GT1,GT2,GI,GST1,GST2,RG1,RG2* and GSTR).

That means that the second validity score SG is equal to the minimum value of all the first validity scores, without taking account of the first validity scores of the equations GT1, GT2, GI, GST1, GST2, RG1, RG2 and GSTR.

Only the IRS measurement is erroneous:

SI=min(all the first scores except those of the equations *IT1,IT2,GI,IS,IST1,IST2,RI1,RI2* and ISTR).

That means that the second validity score SI is equal to the minimum value of all the first validity scores, without taking account of the first validity scores of the equations IT1, IT2, GI, IS, IST1, IST2, RI1, RI2 and ISTR.

Only the ILS measurement is erroneous:

SS=min(all the first scores except those of the equations *GS,IS,GST1,GST2,IST1,IST2,*GSTR and ISTR).

That means that the second validity score SS is equal to the minimum value of all the first validity scores, without taking account of the first validity scores of the equations GS, IS, GST1, GST2, IST1, IST2, GSTR and ISTR.

Only the terrain altitude from the database is erroneous:

ST=min(all the first scores except those of the equations *GT1,GT2,IT1,IT2,GST1,GST2,IST1,IST2,* GSTR and ISTR).

That means that the second validity score ST is equal to the minimum value of all the first validity scores, without taking account of the first validity scores of the equations GT1, GT2; IT1, IT2; GST1, GST2, IST1, IST2, GSTR and ISTR.

Only the distance measurement by radar is erroneous:

SR=min(all the first scores except those of the equations *RG1,RG2,RI1,RI2,*GSTR and ISTR).

That means that the second validity score SR is equal to the minimum value of all the first validity scores, without taking account of the first validity scores of the equations RG1, RG2, RI1, RI2, GSTR and ISTR.

The validities of the measurements are then determined as follows:

$$m_1=m(RA_1)=\max(S0,S2,SG,SI,SS,ST,SR),$$

$$m_2=m(RA_2)=\max(S0,S2,SG,SI,SS,ST,SR),$$

$$m(GPS)=\max(S0,S2,SG,SI,SS,ST,SR),$$

$$m(IRS)=\max(S0,S2,SG,SI,SS,ST,SR),$$

$$m(ILS)=\max(S0,S2,SG,SI,SS,ST,SR),$$

$m(TDB) = \max(S0, S2, SG, SI, SS, ST, SR),$ $m(R) = \max(S0, S2, SG, SI, SS, ST, SR).$ The height H can then be consolidated as follows:

$$H = m_1 m_2 \frac{(H_{RA1} + H_{RA2})}{2} + m_1(1 - m_2)H_{RA1} + (1 - m_1)m_2 H_{RA2} + (1 - m_1)(1 - m_2) \cdot \text{BackUp}$$

The Backup size is determined by several height estimators using the following relationships: $Z_{GPS} - Z_T(X_{GPS})$, $Z_{IRS} - Z_T(X_{IRS})$, $X_{GPS} \tan(\gamma_{GS}) - Z_T(X_{GPS})$, $X_{IRS} \tan(\gamma_{GS}) - Z_T(X_{IRS})$, $Z_R + \Delta Z_{GPS}$, $Z_R + \Delta Z_{IRS}$.

The subject matter disclosed herein can be implemented in or with software in combination with hardware and/or firmware. For example, the subject matter described herein can be implemented in software executed by a processor or processing unit. In one exemplary implementation, the subject matter described herein can be implemented using a computer readable medium having stored thereon computer executable instructions that when executed by a processor of a computer control the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one exemplary embodiment of the invention(s) is disclosed herein, it should be understood that modifications; substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for merging measurements of flight parameters of an aircraft, the measurements of flight parameters being linked to one another by at least one equation, comprising:
   an acquisition step, implemented by at least one acquisition module, comprising acquiring at least one measurement of at least one flight parameter;
   a first scoring step, implemented by a first scoring module, comprising attributing respectively a first validity score to the at least one equation or to each of equations linking the measurements of the flight parameters to one another, the first validity score being determined by checking whether the measurement or measurements of the flight parameter or parameters are a solution or solutions of the equation or equations;
   a second scoring step, implemented by a second scoring module, comprising attributing respectively a second validity score to one or more failure scenarios, each of the failure scenarios involving one or more acquisition modules, the second validity score for a failure scenario considered being determined from the first validity score or scores attributed to the equation or equations linking the measurements of the flight parameters acquired by the acquisition module or modules involved respectively in the failure scenario considered;
   a determination step, implemented by a determination module, comprising determining validity of the measurement or measurements of the flight parameter or parameters from the second validity score or scores;
   a consolidation step, implemented by a consolidation module, comprising consolidating the measurements of the flight parameter or parameters as a function of the validity of the measurements determined in the determination step;
   a transmission step, implemented by a transmission module, comprising transmitting the consolidated measurement or measurements of the flight parameter or parameters to flight controls of the aircraft or an automatic pilot of the aircraft; and
   controlling the aircraft during flight using the flight controls or the automatic pilot based on the measurement or measurements of the flight parameter or parameters transmitted to the flight controls or the automatic pilot via the transmission module.

2. The method according to claim 1, wherein the first scoring step comprises substeps, each of the substeps being implemented for each of the equations and comprising:
   a first computation substep, implemented by a first computation submodule, comprising computing an absolute value of a result of the equation with no second term from the measurement or measurements of the flight parameter or parameters involved in the equation;
   a comparison substep, implemented by a comparison submodule, comprising comparing the absolute value of the result with at least one predetermined threshold value; and
   a first scoring substep, implemented by a first scoring submodule, comprising attributing the first validity score to the equation from the comparison of the absolute value of the result with the predetermined threshold value or values.

3. The method according to claim 2, wherein the absolute value of the result is compared in the comparison substep with a predetermined threshold value, and wherein:
   the first validity score attributed is equal to 1 when the absolute value of the result is below the predetermined threshold value,
   the first validity score attributed is equal to 0 when the absolute value of the result is above or equal to the predetermined threshold value.

4. The method according to claim 2, wherein the absolute value of the result is compared in the comparison substep with a first predetermined threshold value and a second predetermined threshold value, the first predetermined threshold value being lower than the second predetermined threshold value, the first validity score attributed being equal to 1, when the absolute value of the result is below the first predetermined threshold value, the first validity score attributed being equal to 0, when the absolute value of the result is above or equal to the second threshold value,
   wherein the first validity score attributed is greater than 0 and less than 1 according to a monotonic function decreasing from 1 to 0 as the absolute value of the result increases, when the absolute value of the result is above or equal to the first predetermined threshold value and when the absolute value of the result is below the second predetermined threshold value.

5. The method according to claim 1, wherein the first scoring step comprises:
  a second computation substep, implemented by a second computation submodule, comprising computing a statistical value, from a classification method, from the equation or equations and from the measurement or measurements of the flight parameter or parameters; and
  a second scoring substep, implemented by a second scoring submodule, comprising attributing the first validity score by taking account of the statistical value.

6. The method according to claim 1, wherein the second scoring step comprises substeps, each of the substeps being implemented for each of the failure scenarios and comprising:
  a first identification substep, implemented by a first identification submodule, comprising identifying, out of the equation or equations, the equation or equations linking the measurements of flight parameters acquired by the acquisition module or modules involved in the failure scenario, the acquisition module or modules identified further corresponding to the acquisition module or modules for which the failure scenario assumes that the acquisition module or modules provide non-erroneous measurements; and
  a third scoring substep, implemented by a third scoring submodule, comprising attributing the second validity score as a function of the first validity score of the equation or equations identified in the first identification substep.

7. The method according to claim 6, wherein the second validity score attributed in the third scoring substep is equal to a result of a combination by a fuzzy "AND" operator of the first validity score or scores of the equation or equations identified in the first identification substep.

8. The method according to claim 7, wherein the determination step comprises a second determination substep, implemented by a second determination submodule for each of the measurements of the flight parameter or parameters, comprising determining validity of the flight parameter measurement, the validity of the flight parameter measurement being equal to a result of a combination by a fuzzy "OR" operator of the second validity scores attributed to the failure scenarios involving the acquisition module configured to acquire the flight parameter measurement.

9. The method according to claim 6, wherein the second validity score attributed in the third scoring substep is equal to 1 when the equation or all the equations identified in the first identification substep have a first attributed validity score equal to 1, and wherein the second validity score attributed in the third scoring substep is equal to 0 when at least one of the equations identified in the first identification substep has a first validity score different from 1.

10. The method according to claim 9, wherein the determination step comprises substeps, each of the following substeps being implemented for each of the measurements of the flight parameter or parameters and comprising:
  a third identification substep, implemented by a third identification submodule, comprising identifying the failure scenario or scenarios involving the acquisition module configured to acquire the flight parameter measurement, for which the second attributed validity score is equal to 1; and
  a first determination substep, implemented by a first determination submodule, comprising determining the validity of the flight parameter measurement from the failure scenario or scenarios identified in the third identification substep, the flight parameter measurement being valid when there is at least one failure scenario for which the second validity score attributed is equal to 1, otherwise the flight parameter measurement is not valid.

11. The method according to claim 1, wherein the second scoring step comprises:
  a second identification substep, implemented by a second identification submodule, comprising identifying, out of the equations, one or more first equations linking the measurements of flight parameters acquired by the acquisition module or modules involved in the failure scenario, the acquisition module or modules identified further corresponding to the acquisition module or modules for which the failure scenario assumes that the acquisition module or modules provide non-erroneous measurements, and one or more second equations linking the measurements of flight parameters acquired by the acquisition module or modules involved in the failure scenario and for which the failure scenario assumes that the acquisition module or modules supply erroneous measurements; and
  a fourth scoring substep, implemented by a fourth scoring submodule, comprising attributing the second validity score to each of the failure scenarios from the equation or equations identified in the second identification substep.

12. The method according to claim 11, wherein the second validity score attributed in the fourth scoring substep is equal to 1 for the failure scenario or scenarios involving the acquisition module or modules configured to acquire the measurement or measurements of the flight parameter or parameters linked by the equation or equations identified in the second identification substep, when the first equation or equations identified in the second identification substep have a first attributed validity score equal to 1 and when the second equation or equations identified in the second identification substep have a first attributed validity score equal to 0, and wherein the second validity score attributed in the fourth scoring substep is equal to 0 for the failure scenario or scenarios involving the acquisition module or modules configured to acquire the measurement or measurements of the flight parameter or parameters linked by the equation or equations which are not identified in the second identification substep.

13. The method according to claim 11, wherein, for the failure scenario or scenarios involving one or more acquisition modules configured to acquire the measurement or measurements of the flight parameter or parameters linked by the first equation or equations identified in the second identification substep, the second validity score is equal to a result of a combination by a fuzzy "AND" operator of the first validity score or scores attributed to the first equation or equations linking the flight parameters, and wherein, for the failure scenario or scenarios involving none of the acquisition modules configured to acquire the measurement or measurements of the flight parameter or parameters linked by the equation or equations identified in the second identification substep, the second validity score is equal to 0.

14. The method according to claim 13, wherein the determination step comprises a second determination substep, implemented by a second determination submodule for each of the measurements of the flight parameter or parameters, comprising determining validity of the flight parameter measurement, the validity of the flight parameter measurement being equal to a result of a combination by a fuzzy "OR" operator of the second validity scores attributed to the failure scenarios involving the acquisition module configured to acquire the flight parameter measurement.

15. The method according to claim 11, wherein the determination step comprises substeps, each of the following substeps being implemented for each of the measurements of the flight parameter or parameters and comprising:
- a third identification substep, implemented by a third identification submodule, comprising identifying the failure scenario or scenarios involving the acquisition module configured to acquire the flight parameter measurement, for which the second attributed validity score is equal to 1; and
- a first determination substep, implemented by a first determination submodule, comprising determining the validity of the flight parameter measurement from the failure scenario or scenarios identified in the third identification substep, the flight parameter measurement being valid when there is at least one failure scenario for which the second validity score attributed is equal to 1, otherwise the flight parameter measurement is not valid.

16. The method according to claim 1, wherein the flight parameters comprise different flight parameters that are linked to one another by the at least one equation.

17. A system for merging measurements of flight parameters of an aircraft, the measurements of flight parameters being linked to one another by at least one equation, comprising:
- at least one acquisition module configured to acquire at least one measurement of at least one flight parameter;
- a first scoring module configured to attribute respectively a first validity score to the at least one equation or to each of equations linking the measurements of the flight parameters to one another, the first validity score being determined by checking whether the measurement or measurements of the flight parameter or parameters are a solution or solutions of the equation or equations;
- a second scoring module configured to attribute respectively a second validity score to one or more failure scenarios, each of the failure scenarios involving one or more acquisition modules, the second validity score for a failure scenario considered being determined from the first validity score or scores attributed to the equation or equations linking the measurements of the flight parameters acquired by the acquisition module or modules involved respectively in the failure scenario considered;
- a determination module configured to determine validity of the measurement or measurements of the flight parameter or parameters from the second validity score or scores;
- a consolidation module configured to consolidate the measurements of the flight parameter or parameters as a function of the validity of the measurements determined by the determination module; and
- a transmission module configured to transmit the consolidated measurement or measurements of the flight parameter or parameters to flight controls or an automatic pilot of the aircraft for controlling operation of the aircraft;
- wherein the flight controls of the aircraft or the automatic pilot of the aircraft are configured to control the aircraft during flight based on the measurement or measurements of the flight parameter or parameters transmitted to the flight controls or the automatic pilot via the transmission module.

18. An aircraft comprising a system according to claim 17.

19. The system according to claim 17, wherein the flight parameters comprise different flight parameters that are linked to one another by the at least one equation.

* * * * *